United States Patent [19]

Kuhlmann et al.

[11] Patent Number: 4,903,258

[45] Date of Patent: Feb. 20, 1990

[54] MODULARLY STRUCTURED DIGITAL COMMUNICATIONS SYSTEM

[76] Inventors: Klaus Kuhlmann, Auenstr. 102, 8000 Muenchen 5, Fed. Rep. of Germany; John Muyssen, Draaitopstr. 61, B09050 Euergem, Belgium; Manfred Sonnemann, Greppenstr. 83, 8031 Alling, Fed. Rep. of Germany

[21] Appl. No.: 233,801

[22] Filed: Aug. 19, 1988

[30] Foreign Application Priority Data

Aug. 21, 1987 [DE] Fed. Rep. of Germany ....... 3727952
Jun. 13, 1988 [DE] Fed. Rep. of Germany ....... 3820072

[51] Int. Cl.$^4$ ............................................. H04Q 11/04
[52] U.S. Cl. ....................................... 370/58.2; 370/60
[58] Field of Search ....................... 370/58, 60, 66, 67, 370/85, 94

[56] References Cited

U.S. PATENT DOCUMENTS

| 4,653,047 | 3/1987 | Vij et al. | 370/58 |
| 4,736,409 | 4/1988 | Hasegawa et al. | 370/67 |
| 4,787,081 | 11/1988 | Waters et al. | 370/67 |

OTHER PUBLICATIONS

"Betriebs-Software, des ISDN-Kommunikationssystem HICOM" by Thomas et al., 2323 Telcom Report, 1985, pp. 95-106.

Primary Examiner—Robert L. Griffin
Assistant Examiner—Wellington Chin
Attorney, Agent, or Firm—Hill, Van Santen, Steadman & Simpson

[57] ABSTRACT

Modularly Structured Digital Communications system. The multi-tasking operating system of a central system processor control administers a line technology task having device program modules associated with types of terminal equipment and administers a switching technology task having switching procedure program modules independent of the class of terminal equipment and independent of communications service. The line technology task and the switching technology task each have input and output memories operated mailbox like allocated to them. For exchange of messages between the tasks, the multi-tasking operating system have a program bus structure with a transmission protocol defined with universal validity independently of communications service and independently of type of terminal equipment.

25 Claims, 9 Drawing Sheets

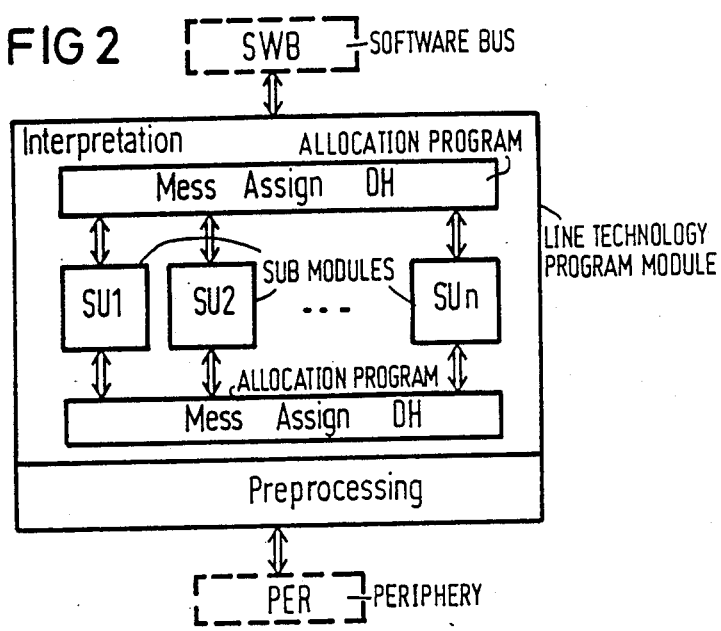
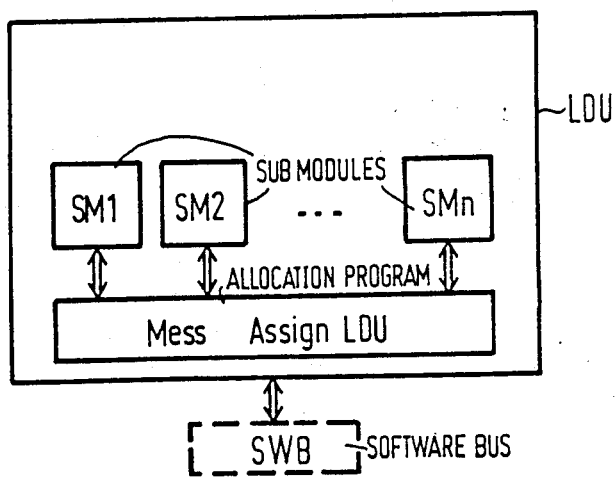

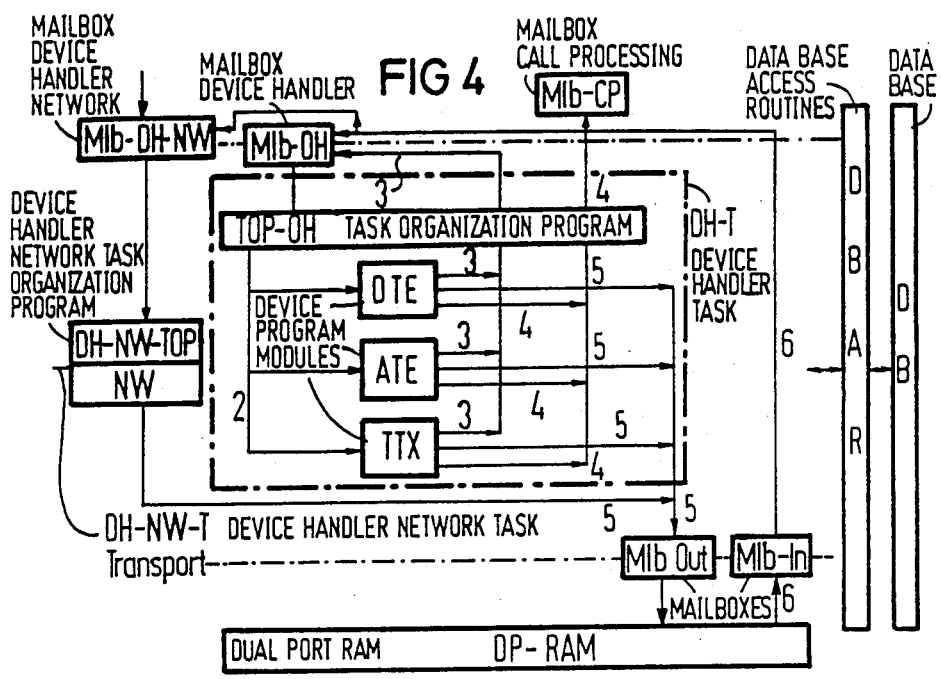
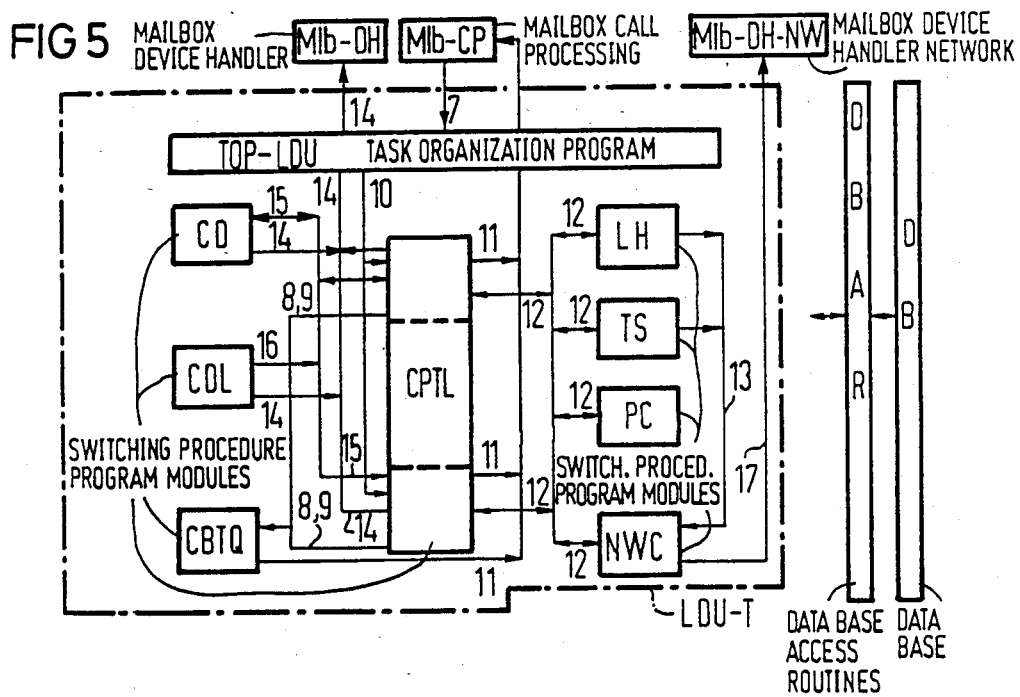

FIG 6

| System Header | SRC - TASK |
| | SRC - SU-TASK |
| | DEST -TASK |
| | DEST-SU-TASK |
| | EVENT CODE |
| Special Header | PORT NR. |
| | CALL REF |
| | SERV IND |
| | PORT NR. |
| | CALL REF |
| | SERV IND |
| | SRC CRSP |
| Data Field | |

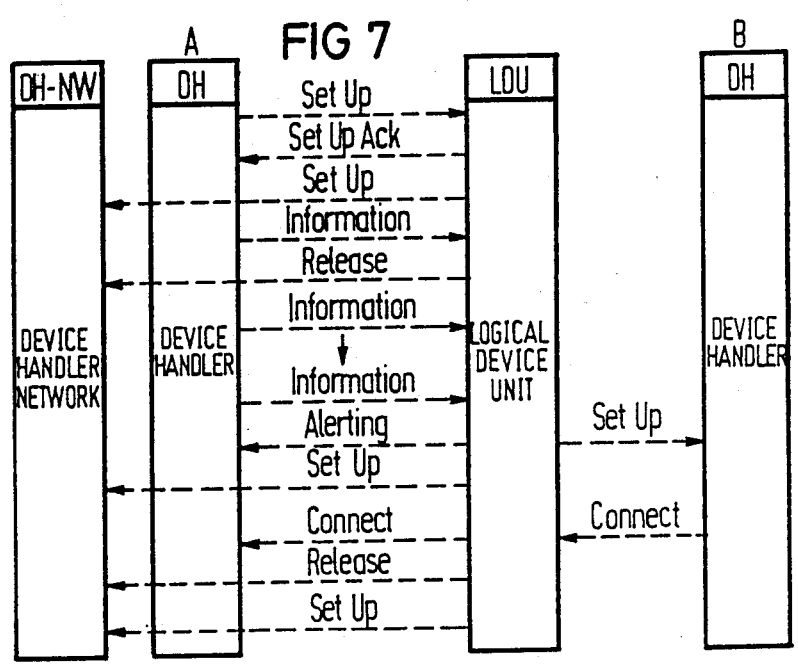
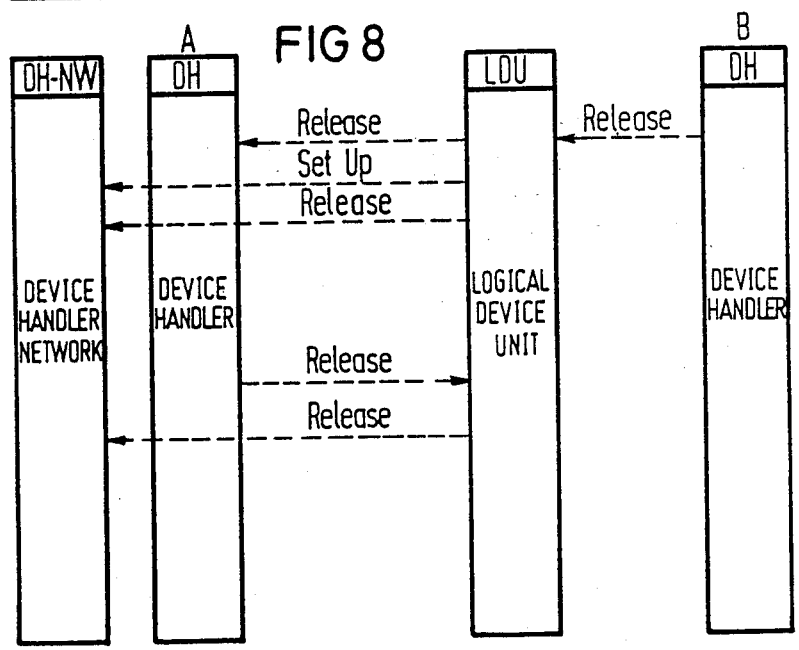

MODULARLY STRUCTURED DIGITAL COMMUNICATIONS SYSTEM

BACKGROUND OF THE INVENTION

Modularly structured digital communications systems serve the purpose of connecting terminal equipment having versatile performance features to one another and the purpose of connecting such terminal equipment to communications networks, particularly public networks.

A special edition of "telecom teport", ISDN im Buero, 1985, discloses such a communications system to which analog and digital telephones, telecopiers, multifunctional terminals, work place systems, personal computers, teletex, picture screen text stations and data terminal equipment can be connected. The structure of the system is designed such that traditional devices having analog transmission can still be connected in addition to digital terminals, as well as, providing the capability of networking with other communications systems. The critical component part of this communications system is a central communication computer having a system data base and at least one multi-tasking operating system. A "task" is herein defined as an independent execution unit that is composed of a runnable program as well as of a respective executive environment, for example memory occupation or apparatus allocation. At every point in time, each task has the status of "active", "waiting" or "quiescent". Tasks can be executed in parallel to one another by a multi-tasking operating system, whereby this can be performed both by a plurality of processors working independently of one another as well as by a single processor in a time-division multiplex method. Further critical properties of tasks are that they can communicate with one another by messages and can mutually synchronize with one another.

The actual circuit technology of the known digital communications system is modularly constructed such that the entire system structure is based on function modules. Internal system interfaces thereby provide the connection between the modules. The most critical component part of the communications system is the central communication computer that can also have a multi-processor configuration.

The performance capability of such a digital communications system is critically determined by the software structure of the system. A known prior art communications system has a modularly structured software architecture whose critical component parts are, first, the multi-tasking operating system or the data base and, second, the actual switching software composed of the periphery software, of the line-technology software and of the switching-oriented connecting software. Logical message interfaces are provided between these various software complexes with which the software complexes are distributed onto different control hierarchies in different configuration levels of the communications system. The allocation of sub-complexes of the control software onto the individual software modules or the overall software structure of the known communications system are adapted to a system size of several hundred through several thousand connections.

SUMMARY OF THE INVENTION

An object of the present invention is to create a modularly structured digital communications system that is optimally adapted to a range from a few connections up to a few hundred connections, whereby it is assumed that voice communication service is dominant in the connection traffic.

This object is achieved by a modularly structured communications system for connecting terminal equipment having versatile performance features to one another and to, in particular, public networks, having a central communication computer with a system data base and at least one multi-tasking operating system:

for the administration of a line technology task having device program modules hierarchically subordinated to a line technology task organization program exercising distributor functions in the sense of a logical network node and that control the signalling procedure and the use surface of the terminal equipment associated with types of terminal equipment, the system data base being respectively individually accessible to the device program modules via defined data base access rountines, and the device program modules having a preprocessing program level that evaluates signals output by the terminal equipment according to individual line criteria and that converts logical messages of the communication computer into setting data for the terminal equipment and having an interpretation program level that converts signal output by the terminal equipment into logical messages according to system-associated parameters, and for the administration of a switching technology task having switching procedure program modules hierarchically subordinated to a switching technology task organization program exercising distributor functions in the sense of a logical network node, the system data base being respectively individually accessible to the switching procedure program modules via the defined data base access routines, and the switching procedure program modules being structured independently of the class of terminal equipment and independently of communications service in the sense of forming logical sub-processes of the overall switching process such that, in addition to forming at least one connection handler program module for the control of the set up and clear down of connections, further performance feature program modules for the activation and de-activation of corresponding control procedures are formed, whereby the line technology task has an input and output memory administered by the line technology task organization program and operated mailbox-like allocated to it and the switching technology task has an input and output memory administered by the switching technology task organization program and operated mailbox-like allocated to it;

the multi-tasking operating system forms and administers a program bus structure having a transmission protocol defined in universally valid fashion independently of communications services and independently of the type of terminal equipment for the messages communicated thereover in the sense of a logical network node for the intercommunication of the connection handler program modules and at least one part of the performance feature program modules with the device program modules via the input and output memories of the switching technology task and of the line technology task.

Critical to the present invention is that the device program modules are associated with the types of terminal equipment such that the entire signalling procedure and the complete user surface of the terminal equipment are governed by them and that a transmission protocol defined in universally valid fashion independently of the communications services and the types of terminal equipment is provided for the messages communicated via the program bus structure of the multi-tasking operating system. These two structural features are the critical prerequisite for both the overall structure of the switching procedure program modules as well as the distribution of individual sub-processes for the connection handling onto the switching procedure program modules occurring within the switching technology task independently of the class of terminal equipment and independently of the communications service. This provides the significant practical advantage that such a digital communications system having an arbitrary initial configuration can be augmented later at any time by additional types of terminal equipment and communications services without the basic structure of the modularly structured communications system having to be altered. When new types of terminal equipment is introduced, a corresponding device program module merely has to be inserted into the line technology task, whereas the remaining structural component parts, i.e. particularly the switching technology task, remain unaffected. This is essentially a result of the inventive structure of the communications system and places the dependencies of communications services and equipment types only into the domain of the line technology task or into that of the data base, so that the switching technology task can be designed for exclusive connection handling independently of the type of terminal equipment to be connected to one another and independently of the communications services utilized by these.

However, it is also conceivable in this context that specific performance features that can only occur in one communications service are combined in a separate performance feature program module of the switching technology task. Such a structuring measure allows an optimally slight fundamental configuration of the communications system since, first, such communications-service-associated performance features are not pre-performed by corresponding performance feature program modules but, on the other hand, a corresponding insertion of such performance feature program modules is possible without difficulty for later incorporation of such communications services.

Overall, the modularly structured digital communications system of the present invention has a universal structure for the greatest variety of system sizes for small systems (a few through a few hundred connections). The structure provides a simple additive expansion and modification of a basic configuration of the communications system, for example for an increase in the number of subscribers, for an increase in performance features and expansion of type of terminal equipment. All increases and expansions are thus implemented by additional device program modules and/or switching procedure program modules and by inputing appropriate data into the data base.

The expansion and increase within the communications system is also particularly facilitated by providing only one line technology task in the region of the line technology structure level for adaptation of the type of terminal equipment, since all line technology functions for switching-oriented terminal equipment have the same priority. According to an advantageous development of the invention the line technology task is supplemented by a switching matrix network task having a switching matrix network device program module administered by a switching matrix network task organization program. This structural measure serves essentially to improve the control dynamics.

The adaptation of the line technology structure level to the actual periphery of the communications system preferably occurs such that a periphery memory administered by an input/output processor has an input terminal for messages for the terminal equipment acquired in the line technology task and/or in the switching matrix network task an output terminal for messages acquired from signals of the terminal equipment, the input terminal and output terminal being controllable independently of one another. An adaptation of the transmission procedures for messages between the input/output processor and the line technology structure level to the transfer procedures between the line technology structure level and the switching technology structure level is achieved in that a transfer memory operated mailbox-like is allocated both to the input terminal as well as to the output terminal and in that the device program modules of the line technology task are linked to the transfer memory for the messages to be output to the terminal equipment. Serving the same purpose are improvements of the present invention wherein the switching matrix network task has an input and output memory administered by the switching matrix network task organization program and operated mailbox-like allocated to it, the input side of this input and output memory being linked to the transfer memory for the signal input from the terminal equipment, and in that the switching matrix network device program module of the switching matrix network task is linked to the transfer memory for the messages to be output to the terminal equipment. The communication of the signals initiated by the terminal equipment from the allocated transfer memory to the input and output memory of the line technology task and/or of the switching matrix network task and/or from the device program modules to the transfer memory for the messages to be output to the terminal equipment accordingly occurs in a transparent layer of a message protocol of the multi-tasking operating system in the same way as the communication of messages between the line technology structure level and the switching technology structure level. The formation of messages and their transfer from the input/output processor to the line technology task or to the data base preferably occurs in the same fashion as the formation and transfer of messages in the line technology task and in the switching technology task or between them. This is assisted by an advantageous improvement of the present invention wherein the input/output processor is equipped with an operating system that is identical to the multi-tasking operating system.

The interpretation program level of the device program modules present in the line technology task interprets signals initiated by the terminal equipment and output from the input/output processor to the device program modules with reference to system-internal parameters and converts them into correspondingly interpreted, logical signals. Thus, for example, a loop interrupt for a pulsed dialing telephone is interpreted as the digit one by a parameter correspondingly allocated to this type of terminal equipment, whereas, for a push-button telephone an occurring loop interrupt is interpreted as actuation of the signal key by a parameter allocated to this type of terminal equipment. For an ISDN terminal equipment with which logical signals can be generally generated, the use of system-internal parameters for the interpretation of the logical signals can be eliminated. The interpretation program level can be considered a logical zero function in such cases.

The interpretation program level preferably has an allocation program for discrimination between signals that start a switching-oriented process and signals that form auxiliary information for a started process. For example, a switchingoriented process is started by lifting a handset up, whereas subsequently selected digits represent auxiliary information for this switching-oriented process. The allocation program is thereby structured such that, upon appearance of a signal starting a switching-oriented sub-process at a point in time at which another switching-oriented sub-process is sequencing, a check for compatibility of these sub-processes is carried out. Dependent on the result of this check, either the second process can be started or a start message for the new sub-process can be suppressed until a message concerning the conclusion of the first sub-process is present. When, by contract, no other switching-oriented sub-process is ongoing when a signal starting a switching-oriented sub-process appears, then the signal is converted into a start message for one of the switching procedure program modules. By contrast, when a signal appears, that form auxiliary information, the result of the allocation program is that logical messages corresponding to the signal are forwarded to one of the switching procedure program modules. For such purposes, the allocation program has a protocol program for storing data concerning the nature of every started process that is still ongoing.

The situation is exploited for a surveyable structuring of the device program modules that the set of functions of a terminal equipment can be respectively divided into exclusive sub-sets. Thus, for example, a distinction can be made between line keys for designational initialization of a connection set up and function keys initiating the involvement of performance features. In adaptation to such a subdivision, a development of the present invention provides that at least one type of device program module has a plurality of device program sub-modules corresponding in number to the number of exclusive sub-sets of all functions of a terminal equipment, and that the allocation program branches onto the device program sub-modules dependent on function.

In a similar fashion, the switching procedure program modules can also be structured such that at least some of the switching procedure program modules have a respective plurality of switching procedure sub-modules allocated to a defined sub-function of the connection handler, branching being carried out onto these by means of an allocation program individually associated to switching procedure program module.

A further structuring measure in the switching technology structure level serves for improving the dynamic properties of the connection handler and provides that the connection handler program module is directly subordinate to the switching technology task organization program. The performance feature program modules are incorporated into the connection handler in the form of sub-programs of the connection handler program module. In the course of the connection set up, one or more of the performance feature program modules is then initiated by the connection handler program module and is initialized to initiate procedures associated to performance features. The collaboration between the connection handler program module and the performance feature program modules thereby preferably occurs such that an appropriate acknowledgement is output to the connection handler program module after execution of the corresponding program steps associated with performance features. The involvement of the performance feature program modules can thereby occur on the basis of system-internal parameters. For example, a selected terminal equipment can have output a request for call rerouting this being stored in the data base as a corresponding job. By access the data base, the connection handler program module identifies this job and initiates a corresponding performance feature program module. The involvement of performance feature program modules in the connection set up, however, can also be initiated by the selection of characteristic number either by actuation of dial keys or by a function key. A request for a manual switching position would be an example of this.

In terms of controls technology, the connection handler program module and the performance feature program modules cover the functional scope of all periphery, circuit-oriented system units. In addition to switching-oriented terminal equipment such as analog or digital telephone equipment or a manual switching position, connector sets and a digital switching matrix network are also to be included among these units. The control of the connection set up and connection clear down between terminals or equipment is provided by the switching procedure program modules. The control covers the checking of the corresponding authorizations and the implementation of barred code checks. Activation and de-activation as well as programming of switching technology performance features proceeding from a switching-oriented condition is provided by the performance feature program modules. The signalling of switching-oriented statuses between the terminal equipment in optical and acoustic form is also initiated in the switching technology structure level and is converted into corresponding signals via the line technology structure level. Further functions that are realized in the switching technology structure level by the connection handler program modules are a digit evaluation, for example for discrimination between direct inward dialing traffic or high-usage trunk traffic, an internal call number re-interpretation and the control of central, circuit-oriented devices such as, for example, a code receiver or tone generators.

An advantageous development of the present invention relates to the control of a digital time-division multiplex switching matrix network of the communications system and its purpose is to achieve an optimally uniform program structure within the switching technology structure level. This is achieved in that the connection handler program module has a switching matrix network control program module allocated to it in which the control of input and output memories of a digital time-division multiplex switching matrix network is logically realized and to which the input and output memory of the switching matrix network task is allocated for the purpose of converting logical messages into physical switch instructions for the switching matrix network. The switching matrix network controller or the switching matrix network control program module thus present itself as a program sub-module of the connection handler program module and is called in in the same fashion as the performance feature program modules. Differing from the performance feature program modules, a direct linkage of the switching matrix network control program module to the line technology structure level is provided.

When the communications system of the invention is also utilized for switching data packets, packet switching, then a packet-switching switching matrix network control program module is provided for the control of the packet-switching switching matrix network that can be linked to the connection handler program module and to a packet-switching switching matrix network device program module by the program bus structure. The same connection handler program module is thus hierarchically super-ordinated over the packet-switching switching matrix network control program module. The linkage, however, is different. This structure is particularly selected in those instances wherein no packet switching is initially provided in a basic configuration of the communications system and this communications service is retrofittet in a later operating phase.

During the program execution within the switching technology task, task-associated memories administered by the switching technology task organization program as well as the data base are accessed. The switching technology task organization program also serves for the call-in of defined procedures of the multi-tasking operating system for the emission or acceptance of messages to or from the input/output memories operated mailbox-like. Further functions of the switching technology task organization program are the supply of the required interfaces within the switching technology task with information needed for the connection handling, for example, information about status or signals, device memory addresses or current connection memory addresses. The centralized release of the connection memories of the actual switching matrix network and code receivers and during call clear down also occurs by the switching technology task organization program.

The data base hierarchically higher-ranking than the line technology task and the switching technology task in conjunction with the data base access rountines primarily serves for the central administration of all data of the switching procedure program modules and of the device program modules as well as for the message and data transport within the software bus structure that are to be considered as task-overlapping. To that end, a central interface for the data access is provided in the data base with formal dependency on the multi-tasking operating system.

The data layout is preferably design oriented to performance feature and terminal equipment, so that an easy expandability thereof in later configuration stages of the communications system is possible by additional performance features, types of terminal equipment or communications services.

The data base can fundamentally accept variable data that are only read and never modified, permanent data that are preserved beyond a system disconnect as well as dynamic data that are not preserved for a system disconnect. These types of data can be comprised in the form of inter-related memory locations formed of data elements, tables, matrices, (every matrix element being a memory location) as well as chained lists. The call-in of the data basis access routines occurs via a single monitoring instruction, supervisor call, whereby the execution of the data base access routines is subsequently parameter-controlled.

According to an advantageous development of the present invention, the data base is structured such that memory areas for the acceptance of connection-relevant data for the duration of the connection and other memory areas separated therefrom for the acceptance of data, volatile data, relevant only during a message exchange are provided therein. The designational interrogation of the data deposited in the two memory areas preferably occurs such that the messages communicated via the program bus structure contain memory addresses for designational selection of the memory areas containing the connection-relevant data belonging to the respective message. In addition to the memory addresses, the head parts of the messages communicated via the program bus structure contain particulars about the program module of a task outputing the message and about the program module of a task intended as receiver.

A dynamic requirement reduction of the line technology structure level and of the switching technology structure level is achieved in that a memory block for data, transparent data, output by a terminal equipment is provided in the memory area for the acceptance of volatile data, these transparent data being accepted by one of the device program modules but being processed neither in this device program module nor in one of the switching procedure program modules. The transmission of these transparent data to a receiver terminal equipment occurs such that the transparent data can be output from this memory block to a device program module allocated to the type of the receiver terminal equipment for transmission to the receiver terminal equipment. A universal adaptation to the connection traffic with digital terminal equipment, particularly with ISDN terminal equipment, is achieved in that the messages has service indicators oriented to the possible, different communications services in a useful data channel of a connection line to the terminal equipment, these service indicators being utilized as the basis for compatibility checks and for defining the type of receiver terminal equipment connected to the respectively requested communication service. This service indicator thus serves for the identification of the service in the useful channel that is currently present in a connection. The useful channel can thereby be both the B-channel as well as the D-channel of the ISDN protocol. At least for ISDN terminal equipment, the service indicator is thus a necessary auxiliary information to the selection information. The service indicator can thereby be designed merely as indicator information for the presence of an ISDN connection, whereas the actual, service-associated information are not an integral component part of the messages but are transferred into one of the memory areas, preferably in the memory areas for the acceptance of connection-relevant data.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several figures of which like reference numerals identify like elements, and in which:

FIG. 2 is a diagram of a fundamental structure of a device program module;

FIG. 3 is a diagram of a fundamental structure of a switching procedure program module;

FIG. 4 is a diagram of a structure and system environment of the line technology task;

FIG. 5 is a diagram of a structure and system environment of the switching technology task;

FIG. 6 is a diagram of a fundamental structure of teh messages transmitted between the tasks;

FIG. 7 is a diagram of a task-overlapping messages during connection set up;

FIG. 8 is a diagram of a task-overlapping messages during connection clear down;

DESCRIPTION OF THE PREFERRED EMBODIMENT

Figure 1:
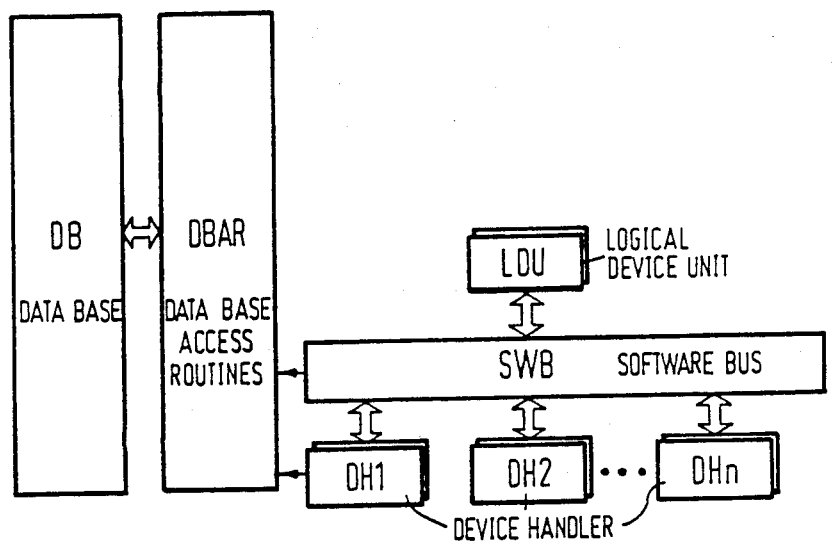
FIG. 1 is a diagram of the basic structure of the control of a communications system.

The basic control structure of a digital communications system shown in FIG. 1 has two control structure levels wherein one serves for the control of periphery devices by means of line technology program modules DH1, DH2 ... DHn (device handlers) adapted to a type of terminal equipment, these periphery devices including not only terminal equipment connected to the periphery but also central, circuit oriented devices such as connector units and a switching matrix network. Each of these line technology program modules DH1, DH2 ... DHn provides a system-uniform interface to the switching technology structure level that is represented by a switching procedure program module LDU (logical device unit) in the present case. The information exchange between the line technology structure level and the switching technology structure level occurs by messages defined with universal validity that are transmitted via a software bus structure SWB that can be considered as an integral component part of the operating system of a communication computer (not shown). The switching procedure program module LDU, the line technology program modules DH1, DH2 ... DHn and the software bus SWB have access to a data base DB of the overall communications system by a data base access routines DBAR.

The line technology program modules DH1, DH2 ... DHn are associated with types of terminal equipment such that they control the signalling procedure and the user interface of the corresponding type of terminal equipment. The switching procedure program module LDU is structured independently of the type of terminal equipment and independently of communications service such that it governs the maximum function scope of the periphery devices and equipment in control-oriented terms. The functions of the switching procedure program module LDU thus cover the sub-processes of the overall switching procedure needed for the control of the connection set up and clear down. Thus, for example, authorizations are checked, barred code checks are carried out, a signalling of switching-oriented statuses occurs between the terminal equipment and an activation and deactivation of switching technology performance features can be implemented dependent upon the various, switching-oriented statuses.

FIG. 2 shows the fundamental structure of a line technology program module DH. This structure essentially has an interpretation program level Interpr and a pre-processing program level Prepr. In the pre-processing program level Prepr, signals from the periphery PER are interpreted according to individual line criteria and are output to the interpretation program level Interpr in an appropriately edited form. Over and above this, the pre-processing program level Prepr serves for converting logical messages that are transmitted via the software bus SWB to the line technology program module DH into setting data for the periphery devices. The messages forwarded to the line technology program module DH can also be additionally interpreted and converted in the interpretation program level Interpr before a processing in the pre-processing program level Prepr. However, the interpretation program level Interpr, essentially converts the signal output from the periphery, in part after prior handling in the pre-processing program level Prepr, into logical messages. The formation of these logical messages results from system-associated parameters that are at least partly reside in the data base. The interpretation program level Interpr has program sub-modules SU1, SU2 ... SUn that provide switchingassociated sub-functions in the control of the signalling procedure and of the user interface of the terminal equipment of the periphery PER. In this way, for example, a structural discrimination can be made between necessary control events in single digit selection, in selection of digit blocks and in actuation of keys for the initiation of performance features. The allocation of the signals or messages to the individual program sub-modules SU1, SU2 ... SUn occurs by means of an allocation program Mess Assign DH (message assignment). This allocation program Mes Assign DH also serves the purpose of distinguishing between signals that, first, start a switchingoriented process and, second, auxiliary information for a process that has already been started.

The fundamental structure of a switching procedure program module LSU shown in FIG. 3 is similar to the structure of a line technology program module shown in FIG. 2 insofar as program sub-modules SM1, SM2 ... SMn and an allocation program Mess Assign LDU are also provided. The switching procedure program sub-modules SM1, SM2 ... SMn are allocated to a defined sub-function of the connection handling. Messages from the line technology structure level are received via or are transmitted via the software bus SWB.

FIG. 4 shows the line technology structure level in the system environment in a more detailed illustration. The line technology structure level is essentially formed by a line technology task DH-T in which device program modules DTE, ATE, TTX are hierarchically subordinated to a line technology task organization program TOP-DH. The device program modules DTE, ATE, TTX control the signalling procedure and control the user interface of digital terminal equipment DTE, analog telephone terminal equipment ATE and teletex equipment TTX. Toward the periphery of the communications system, the line technology task DH-T cooperates with the memory DP-RAM of an input/output processor. The communication of signals to the line technology task DH-T or of setting data to the periphery occurs via transfer memories M1b-In, M1b-Out operated mailbox-like that are to be considered as an integral component part of the transport level for signal and setting data. The transport level is supplemented by an input and output memory M1b-DH operated mailbox-like via which the line technology task DH-T accepts signals from the transfer memory M1b-In and from the switching technology structure level (not shown), whereby the messages generated by the line technology task DH-T and intended for the switching technology structure level are output to an input and output memory M1b-CP.

The line technology structure level is supplemented by a switching matrix network task DH-NW-T that has a switching matrix network device program module NW that is hierarchically subordinated to a switching matrix network task organization program DH-NW-TOP. The switching matrix network task DH-NW-T likewise has an input and output memory M1b-DH-NW operated mailbox-like and administered by the switching matrix network task organization program DH-NW-TOP allocated to it. This input and output memory M1b-DH-NW has its input side linked to the transfer memory M1b-In for the signal input from the terminal equipment but, over and above this, also accepts messages from the switching technology structure level.

The switching matrix network device program module NW as well as the device program modules DTE, ATE, TTX have access to the data base DB of the communications system via the data base access routines DBAR.

The interfaces within the line technology structure level symbolically indicated with arrows have the following significance in detail:

1: Pending message from the switching technology structure level to the line technology task DH-T or to the switching matrix network task DH-DW-T.

2: Type-associated program start with interface supply by the line technology task organization program TOP-DH on the basis of the type of terminal equipment addressed.

3: Message interface within the same type of device program module.

4: Message interface to the switching technology structure level.

5: Interface via the memory DP-RAM to the periphery technology for transparent and non-transparent adjustment under the influence of waiting list programs of the operating system.

6: Interface via the memory DP-RAM from the periphery technology, for example for the acceptance of interpreted results of interrogation processes (polling) of the periphery terminal equipment. Destination memories are the input and output memories M1b-DH, M1b-DH-NW operated mailbox-like.

The interface selection and administration for depositing device memory addresses, current connection memory addresses, the call-in of transport procedures for the respective input and output memory M1b-DH, M1b-DH-NW, as well as the centralized release of the connection memories each result by means of the line technology task organization program TOP-DH or TOP-NW-DH.

The switching technology structure level shown in FIG. 5 again exhibits fundamental similarity to the line technology structure level illustrated in FIG. 4. A switching technology task LDU-T has a switching technology task organization program TOP-LDU to which a plurality of switching procedure program modules are hierarchically subordinated. The connection of the switching technology task LDU-T to the system environment with respect to the data base DB again occurs via the data base access routines DBAR and the connection with respect to the line technology structure level occurs by the input and output memories M1b-DH or M1b-DH-NW in outgoing direction and occurs in an incoming direction via the input and output memory M1b-CP directly allocated to the switching technology task LDU-T.

The switching procedure program modules are structured such that a connection handler program module CPTL (call processing trunk line) in which two sub-modules for trunk control or line control are indicated by broken-line subdivision and a further seven performance feature program modules for the activation and de-activation or corresponding control procedures associated to performance feature are formed. The function of the performance feature program modules shall be set forth below: Performance Feature Program Module CD (Call Distribution):

This program module is called in by the connection handler program module CPTL when a subscriber has dialed a characteristic number identifying a manual switching position, when a call is rerouted to the manual switching position or when a terminal equipment is called for which a request for rerouting incoming calls to a manual switching position is entered in the data base. Also coming into consideration in addition to the manual switching position are a night time extension or a call forwarding location or similar, correspondingly pre-determined positions for the acceptance of calls. The position to be called is identified on the basis of the current condition of the system. For changes in the status of the system, for example upon transition from standard traffic mode to night time mode, the signalling is automatically adapted at the called location, the calling location not being affected. This performance feature program module CD can also be constructed such that it transmits an acknowledgement when the connection set up can not occur, for example for route blocking in the night time mode.

Performance Feature Program Module CDL (Call Dispatching Line):

This performance feature program module CDL is also called in by the connection handler program module. This occurs when there is a connection request to a defined subscriber but this request must also be signalled at other subscribers, for example broker serial system subscribers, call pickup group. The performance feature program module CDL identifies the voice stations to be called.

Performance Feature Program Module CBTQ (Call Back and Trunk Queuing):

The roll-in and roll-out as well as the execution of call back and camp-on waiting list jobs are realized in this performance feature program module CBTQ.

Performance Feature Program Module LH (Line Hunting):

The roll-in and roll-out and the execution of calls to one or more BBX line groups is realized with this performance feature program module LH.

Performance Feature Program Module PC (Paging Controller):

This performance feature program module is also called in by the connection handler program module CPTL either when a corresponding characteristic number was dialed or a call was routed to the personal paging system. The performance feature program module PC autonumously administers the paging requests even when the requestor has already hung up again. When a plurality of requests pend simultaneously, the page signalling can be synchronized. Report requests are accepted and the connection set up between a paging and a reporting terminal equipment is assisted. In addition, the output of an acknowledgment to the requestor can be initiated when entering the page requests.

Performance Feature Program Module TS (Trunk Searcher):

The program module TS searches a corresponding line set for the presence of specific indicators in the messages. The performance feature program module TS thereby supplies the necessary data for the connection traffic for digit emission such as, for example, the pauses to be observed between digits or switching from pulsed dialing to multi-frequency code selection.

The performance feature program module NWC (network controller) is also included among the performance feature switching matrix network control being realized with this performance feature program module NWC. The performance feature program module NWC reserves predetermined routes and releases them as per instruction. It is thus responsible for the administration of the time slots in the time-division multiplex switching matrix network. For the actual physical setting of the switching matrix network, the performance feature program module NWC compiles and outputs switch functions for the switching matrix network device program module. The interfaces within the switching technology structure level symbolically indicated by arrows have the following significance in detail:

7: Pending message from the line technology structure level to the switching technology task LDU-T;

8,9: Sub-program call-in for the execution of a call-back or pre-note job;

10: Call-in of the connection handler program module CPTL with interface supply by the switching technology task organization program TOP-LDU;

11: Message interface for the transfer of messages within the switching technology task LDU-T;

12: Sub-program call-in with acknowledgement to the performance feature program modules NWC, PC, TS, LH as assistance during the connection set up;

13: Sub-program call-in to the performance feature program module NWC serving the purpose of switching matrix network control by the performance feature program modules LH, TS for route reservation after searching a free PBX line group subscriber or a connector set;

14: Message interface for the administration of the setting jobs for the line technology structure level;

15: Sub-program call-in with acknowledgement by the connection handler program module CPTL upon selection of a manual switching position or call rerouting thereto for the identification of the extension to be called;

16: Sub-program call-in with acknowledgement by the connection handler program module CPTL when a set up to a subscriber is present and a parallel signalling to other voice stations is to be carried out;

17: Message interface to the destination mailbox M1b-DH-NW of the switching matrix network task.

FIG. 6 shows the fundamental structure of the messages both within the structure levels as well as between the structure levels. The messages are fundamentally divided into three message sections. A system header, defined system-wide, is followed by a specific header that is different dependent on transmission direction for message traffic between two structure levels. This specific header is followed by the actual data part. All messages are compiled in this basic format in a user memory.

The system header which is valid for every communication between the structure levels system-wide is constructed in the following way. The first location is an identification number of the task outputting the message, this being augmented in the following field by an identification number of the sending program module or program sub-module within the transmitting task. The identification number of the receiving task or of the receiving module within this task is correspondingly recited in the two following data fields. A logical element is situated in the data field EVENT CODE. The possible, further message elements are deposited in the corresponding memory areas of the data base.

The structure of the specific header following the system header varies depending upon the structure levels in communication with one another in the message traffic as well as with the transmission direction of the message between these structure levels. FIG. 6 is based on messages between the line technology structure level and the switching technology structure level. The connection designation of a line on which a defined subscriber terminal equipment appears as a transmitter is situated in the first data field. The call number of this transmitting terminal equipment is contained in the following data field. This is followed by a field for a service indicator with which information is provided regarding the nature of the requested communication service on the trunk, particularly to an ISDN terminal equipment. The same connection-relevant parameters for the terminal equipment provided as a receiver are transmitted in the following three data fields. Address data for memory areas within the data base in which further data belonging to the message are deposited are transmitted in the data field SRC CRSP (store pointer) following thereupon.

Data from the memory area for volatile data can be contained in the following data part.

Particularly occurring in the specific header are a multitude of further message elements that, for example, indicate what signalling message is involved, that is what B-channel of an ISDN connection is provided or what performance features are to be transmitted that are also present in the public network in network-overlapping fashion. Further message elements provide for the transmission of indicator information produced in the switching technology structure level to the terminal equipment or for the transmission of fee units. Different message types can be defined with a multitude of correspondingly logically defined message elements for the messages between the individual structure levels of the communications system, a few of the essential ones thereof being described below:

Alerting: This message type is used for messages from the switching technology structure level to the line technology structure level and has the connotation that the connection can be set up to the destination; the message contains the statement that the call should be signalled at the connection destination.

Cancel: This message type is utilized in both directions between the line technology structure level and the switching technology structure level in order to request the deactivation of performance features.

Cancel Acknowledge: This message occurs as an acknowledgement in response to the message "CANCEL" and confirms the de-activation of the corresponding performance feature.

Cancel Reject: This message rejects the request for deactivation of a performance feature.

Connect: This message type is again utilized between the line technology structure level and the switching technology structure level. In the direction toward the switching technology structure level, this message communicates the call acceptance, whereas the calling side is informed in the opposite direction that the connection is through-connected up to the destination.

Disconnect: The message is used proceeding from the switching technology structure level to the line technology structure level in order to communicate that the connection can not be set up to the destination because, for example, the called subscriber is busy. In this phase, performance features, for example request for a connection position, can still be requested.

Facility: Proceeding from a process, this message from the line technology structure level to the switching technology structure level initiates a connection-dependent performance feature, for example, offering call waiting. In the opposite direction, this message initiates a connection-dependent performance feature proceeding from a process, for example direct addressing. The "Facility" message can thereby be used as a logical generic term for a multitude of messages, whereby the actual performance feature that is to be initiated is then sent in a message element of this message.

Facility Acknowledge: This message is used between the switching technology structure level and the line technology structure level as positive acknowledgement for a performance feature request.

Facility Reject: This message rejects the activation of a requested performance feature in both directions.

Information: Auxiliary information - for example for signalling a call to a plurality of voice stations - can be communicated between the switching technology structure level and the line technology structure level with this message. In the direction toward the switching technology structure level, digits can also be transmitted with this message.

Register: This message is used in both directions between the switching technology structure level and the line technology structure level in order to request the activation of a performance feature that is not connection-related. The message thereby stands as a generic term for a plurality of messages that are individualized by different data in at least one of the message elements for the purpose of distinguishing different performance features.

Register Acknowledge: This message is used in both directions between the switching technology structure level and the line technology structure level in order to confirm the activation of a performance feature that is not connection-related.

Register Reject: The request for activation of a performance feature is rejected by this message in both directions.

Release: Directed from the line technology structure level to the switching technology structure level, a release event is initiated with this message. In the opposite direction, the line technology structure level is informed that the cooperating terminal equipment has released. This message can also be used in order to disconnect connecting routes and tones.

Set Up: From the line technology structure level to the switching technology structure level, a switching-oriented process is started with this message. For block selection, this message contains all of the information needed for the connection set up but contains only a part of these information given individual digit dialing. In the opposite direction, this message has different connotational content; dependent on which switching-oriented sub-process is present, the message can represent the call report to the called side, the occupation of a set or a parallel signalling. Switch requests for a digital switching matrix network are also communicated with this message, for example, route through-connection or connect tones.

Set Up Acknowledge: This message is transmitted in the direction toward the switching technology structure level as a positive acknowledgement when the line technology structure level has identified proceedto-select condition or when the dial tone was recognized. In the opposite direction, this message is transmitted as an acknowledgement in response to a message "set up" when the requested process was capable of being started.

FIG. 7 shows the chronological course of messages between the switching technology structure level and the line technology structure level. After the handset of a telephone subscriber "A" is lifted up, a signal to the line technology structure level occurs and the latter converts this into a message "set up" to the switching technology structure level LDU. As acknowledgement, the device program module of the calling subscriber receives the message "Set Up Acknowledge".

The connection control program module in the switching technology structure level LDU sends a message "set up" in response thereto to the switching matrix network task DH-NW in order to connect the dial tone for the calling subscriber. Upon arrival of the first message "information" from the device program module of the calling subscriber at the switching technology structure level LDU (for example, the "information" comprises the first digit of a selection digit sequence), the dial tone is disconnected with a message "release" to the switching matrix network task DH-NW.

A plurality of further information (for example, further dial digits) that are respectively output to the switching technology structure level LDU follow.

After communication of all dial digits, the switching technology structure level LDU sends the following messages:

The device program module of the calling subscriber "A" receives a message "alerting", insofar as the called subscriber is free.

A message "set up" to the switching matrix network task DH-NW connects the free signal and A message "set up" is transmitted to the device program module DH of the calling subscriber, whereby a call event for the corresponding terminal equipment can be initiated.

When the called subscriber "B" answers, a message "connect" is generated by the device program module DH of the called subscriber and is output to the switching technology structure level LDU. This "connect" message is then forwarded to the device program module DH allocated to the calling subscriber. Subsequently, a "release" message is generated in the switching technology structure level LDU and is emitted to the switching matrix network task DH-NW, whereupon the free tone is in turn disconnected at the calling subscriber.

As a last, necessary message for the interconnection of the two subscribers, the switching technology structure level LDU outputs an appropriate message "set up" to the switching matrix network task DH-NW.

The release of a connection between two subscribers is shown in FIG. 8.

It is assumed that the called subscriber "B" wishes to end a connection by hanging his handset up. As a result the device program module DH allocated to this subscriber outputs a "release" message to the switching technology structure level LDU that forwards this message to the device program module DH allocated to the other subscriber "A". Over and above this, the switching technology structure level LDU sends a "release" message to the switching matrix network task DH-NW in order to release the connection at the B-side and sends a "set up" message to the switching matrix network task DH-NW in order to connect the busy signal at subscriber "A".

When the subscriber "A" subsequently hangs up his handset, the device program module DH allocated to this subscriber equipment generates a "release" message that is output to the switching technology structure level LDU. This leads to the generation of a "release" message in the switching technology structure level LDU that is output to the switching matrix network task DH-NW in order to disconnect the busy signal there and to likewise release the connection at the A-side.

Figure 9:
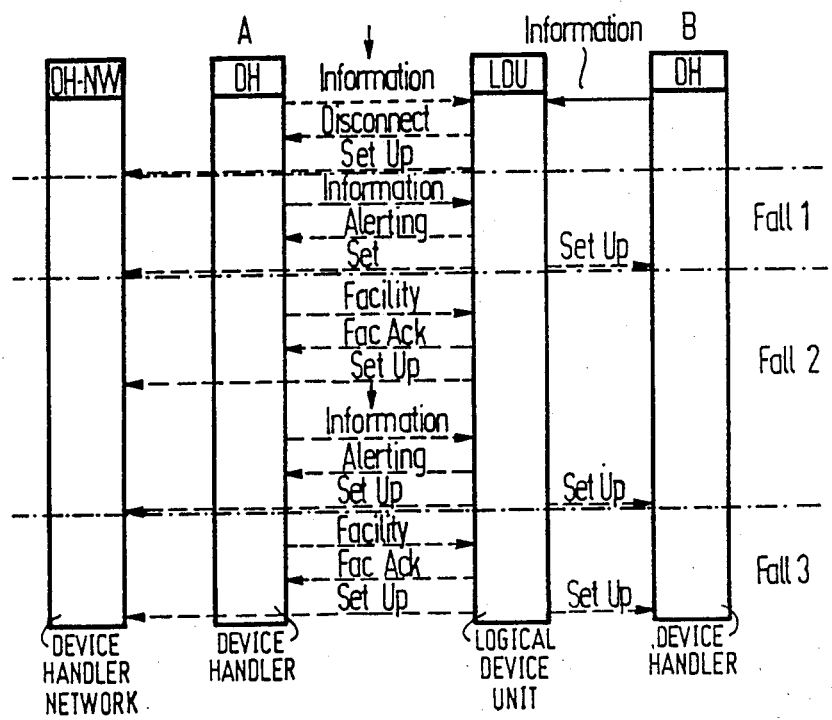
FIG. 9 is a diagram of a task-overlapping messages during activation of a performance feature.

FIG. 9 shows the message traffic between the different structure levels of the communications system for the connection set up to a busy subscriber and subsequent activation of a performance feature. After forwarding of the last dial digit with the message "information" from the device program module of the A-subscriber to the switching technology structure level LDU, when the B-subscriber is busy the device program module DH allocated to the latter is informed with a message "information" to the switching technology structure level LDU, this generates a message "disconnect" in which a reason is contained in a defined message element.

The switching matrix network task DH-NW then receives a "set up" message from the switching technology structure level LDU that leads to the connection of the busy signal for the A-subscriber.

Proceeding from this switching-oriented status, the A-subscriber has the possibility of initiating a connectiondependent performance feature, for example, an offering on to the existing connection of the B-subscriber. The initiation of this offering can be carried out either by a re-dialing (Case 1), by a signal key (Case 2) or by actuation of a function key (Case 3).

For re-dialing (Case 1), the additional dial digits are output to the switching technology structure level LDU with the "information" message and, for acceptance of this performance feature an "alerting" message occurs that states that the connection can be set up up to the called side and that the call is being signalled at the connection destination. With a "set up" message to the device program module DH of the B-subscriber, a signalling of the offering is initiated and a "set up" message to the switching matrix network task DH-NW switches the connection between the A-subscriber and B-subscriber in the switching matrix network.

When the "offering" performance feature is initiated by actuation of the signal key and additional selection (Case 2), then the device program module of the A-subscriber first outputs the "facility" message to the switching technology structure level LDU and the latter acknowledges this with the "facility acknowledge" message. In addition, a "set up" message is output to the switching matrix network task DH-NW in order to connect a positive acknowledgement tone. The message exchange occurs in the same way as in Case 1 from the selection of the additional digits ("information" message) up to the through-connection of the switching matrix network at the side of the A-subscriber and at the side of the B-subscriber.

When the performance feature is initiated with a corresponding function key at the A-subscriber, the exchange of the messages "facility" and "facility acknowledge" between the device program module DH allocated to the A-subscriber and the switching technology structure level LDU initially occurs again. A signalling of the offering subsequently occurs with a "set up" message to the device program module of the B-subscriber and the through-connection of the connection occurs with a "set up" message to the switching matrix task DH-NW.

Figure 10:
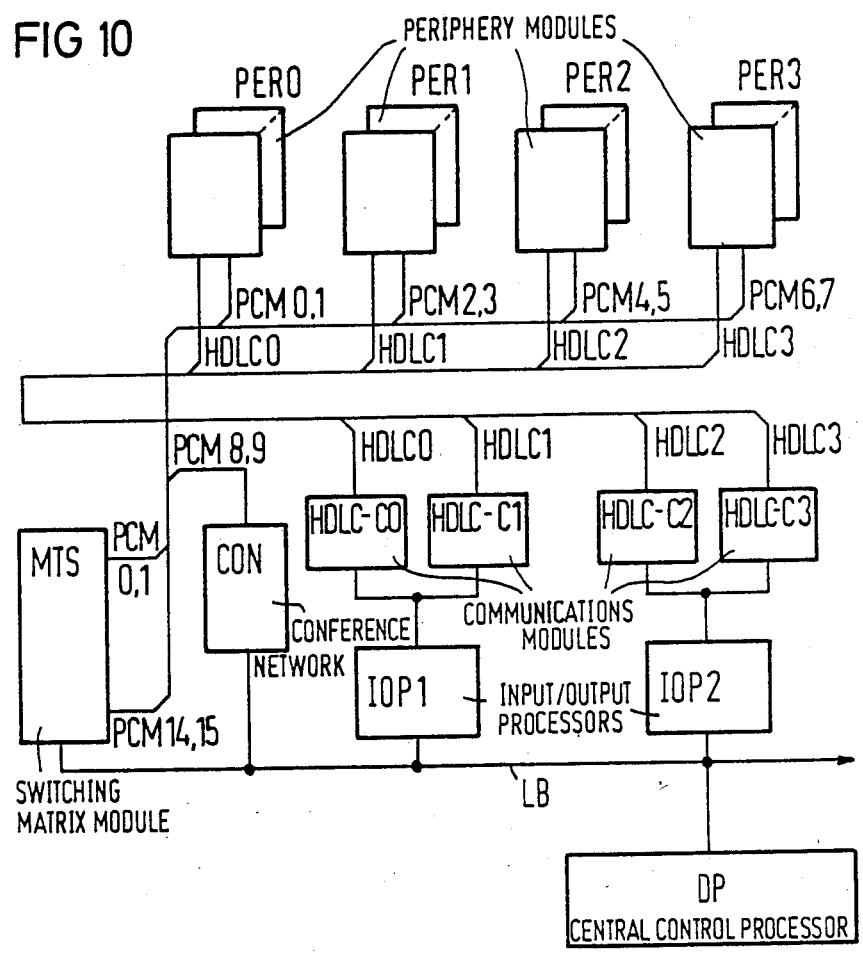
FIG. 10 is a diagram of a hardware architecture of a communications system representing the basis for the control according to FIG. 1, having peripheral modules for a total of 64 subscriber or line terminals.

The communications system shown in FIG. 10 that can be controlled with the control methods illustrated in FIGS. 1 through 9 is essentially divided into three hierarchical structure levels. The periphery level essentially serving for connection of terminal equipment and lines is formed by three periphery modules PER1, PER2, PER3 each of which is constructed of a plurality of subscriber terminal assemblies or, respectively, line terminal assemblies such that a maximum of 64 ports, for example, 32 to-wire line connections, are accessible at the periphery modules PER1 . . . PER3.

For example, the subscriber terminal assemblies can serve for the connection of analog subscriber terminal equipment. They then usually have one interface means with indication of call and loop closure per terminal equipment to which a processor means for analog-to-digital or digital-to-analog conversion and for programmable input impedance or level matching is allocated. A possible realization of these component parts of a subscriber terminal assembly is disclosed in U.S. Pat. No. 4,381,561. The interface between a maximum of 16 such line-associated equipment and internal communications system PCM connections or HDLC control lines (high level data link control) is formed by an assembly processor control that can, for example, correspond in terms of structure and functioning to the processor disclosed by U.S. Pat. No. 4,694,452. Further details about the function of this processor are disclosed in the product publication of Siemens Ag, PBC peripheral board controller PEB 2050 (SM 205) preliminary technical description (Part 1), Ordering No. B/2684101. The coordination control of the assembly processor control is provided by a microprocessor that can be an integral component part of every subscriber terminal assembly. The job of the coordination control, however, can also be assumed by an input/output processor, for example IOP1, allocated to the respective subscriber terminal assembly.

Other terminal assemblies for, for example, digital or ISDN equipment or links can be provided in each of the periphery modules PER1, PER2, PER3 either alone, additionally or in combination.

The module processor controls, essentially formed by assembly processor controls, and at least one microprocessor serving for the coordination thereof each administer two PCM-structured connections (PCM highways) PCM2, PCM3; PCM4, PCM5; PCM6, PCM7 and a respective, doubly direction connection for the transfer and acceptance of control information that are transmitted in the standardized data transmission procedure HDLC. A further periphery module PER0 supplies the communications system with call progress tones, announcements and music during the hold status of connections. The additional periphery module PER0 also contains audible character receivers transmission and reception devices for selection characters transmitted in multi-frequency code procedure as well as test transmitters and test receivers. The additional periphery module PER0, similar to the periphery modules PER1, PER2, PER3, is connected via two PCM highways PCM0, PCM1 and well as via an information transmission link HDLC0.

Figure 12:
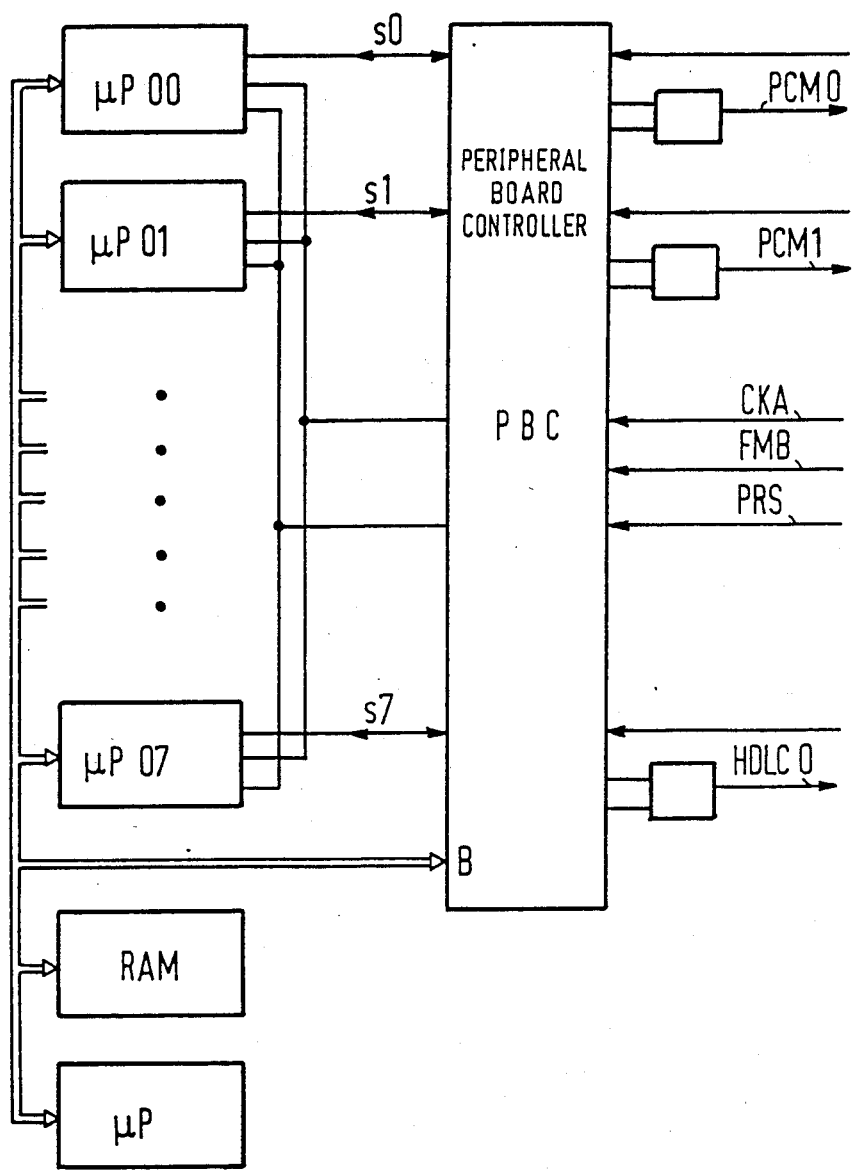
FIG. 12 is a diagram of a schematic illustration of a periphery module having devices for supplying the communications system with call progress tones and for the reception and transmission of selection characters.

The structure of the additional periphery module PER0 is shown in FIG. 12 and shall be described later.

The next structure level of the digital communications system is formed by a total of four (control information) communications modules HDLC-C0, HDLC-C1, HDLC-C2, HDLC-C3 (HDLC controllers) as well as by two input/output processor IOP1, IOP2, the input/output processor IOP1 being allocated to the two communications modules HDLC-C0 and HDLC-C1 and the input/output processor IOP2 being allocated to the communications modules HDLC-C2, HDLC-C3.

Since the HDLC standard is used for the exchange data, instructions and messages in many applicable, practically realized systems, corresponding control information communications modules are implemented in the form of integrated circuits; the communications system shown in FIG. 1 uses these modules (HDLC controllers) in the standard way, so that no hardware or software adaptations are needed for the utilization of these modules in the communications system. In the framework of the communications system of the present invention, the block check field in the data transmission blocks defined in the HDLC standard is of particular significance since the block check character string transmitted in this field enables an error-protected forwarding of control information.

A digital switching matrix network module MTS to which all PCM highways PCM0, PCM1 . . . PCM14, PCM15 are connected also belongs in the same structure level as the control information communications modules HDLC-C0 . . . HDLC-C3. For example, the digital switching matrix network module is implemented with an integrated circuit PEB 2040 of Siemens AG. Structure and functioning of a digital switching matrix network module are disclosed, for example, by U.S. Pat. No. 3,678,206.

A conference network CON that is connected to the digital switching matrix network module MTS with two further PCM highways PCM8, PCM9 is likewise connected into the structure level of the communications modules HDLC-C0 . . . HDLC-C3 and of the digital switching matrix network module MTS. A possible realization of the conference network CON is disclosed by U.S. Pat. No. 4,054,757.

Just like the two input/output processors IOP1, IOP2, the digital switching matrix network module MTS and the conference network CON are connected to a local multiplex bus LB that represents the interface to the hierarchically highest structure level of the digital communications system. This structure level is formed by a central control processor DP that administers the system data base (see FIG. 1 and appertaining description) and that coordinates the collaboration of all assemblies and modules of the communications system. Significant functions of the central control processor are thus the storage and request-suited running of exchange-oriented programs and, toward the periphery, the control and monitoring of the local bus LB. Additional, standard functions of the central control processor are operations-oriented executions, reliability-oriented displays as well as clock generating.

Figure 11:
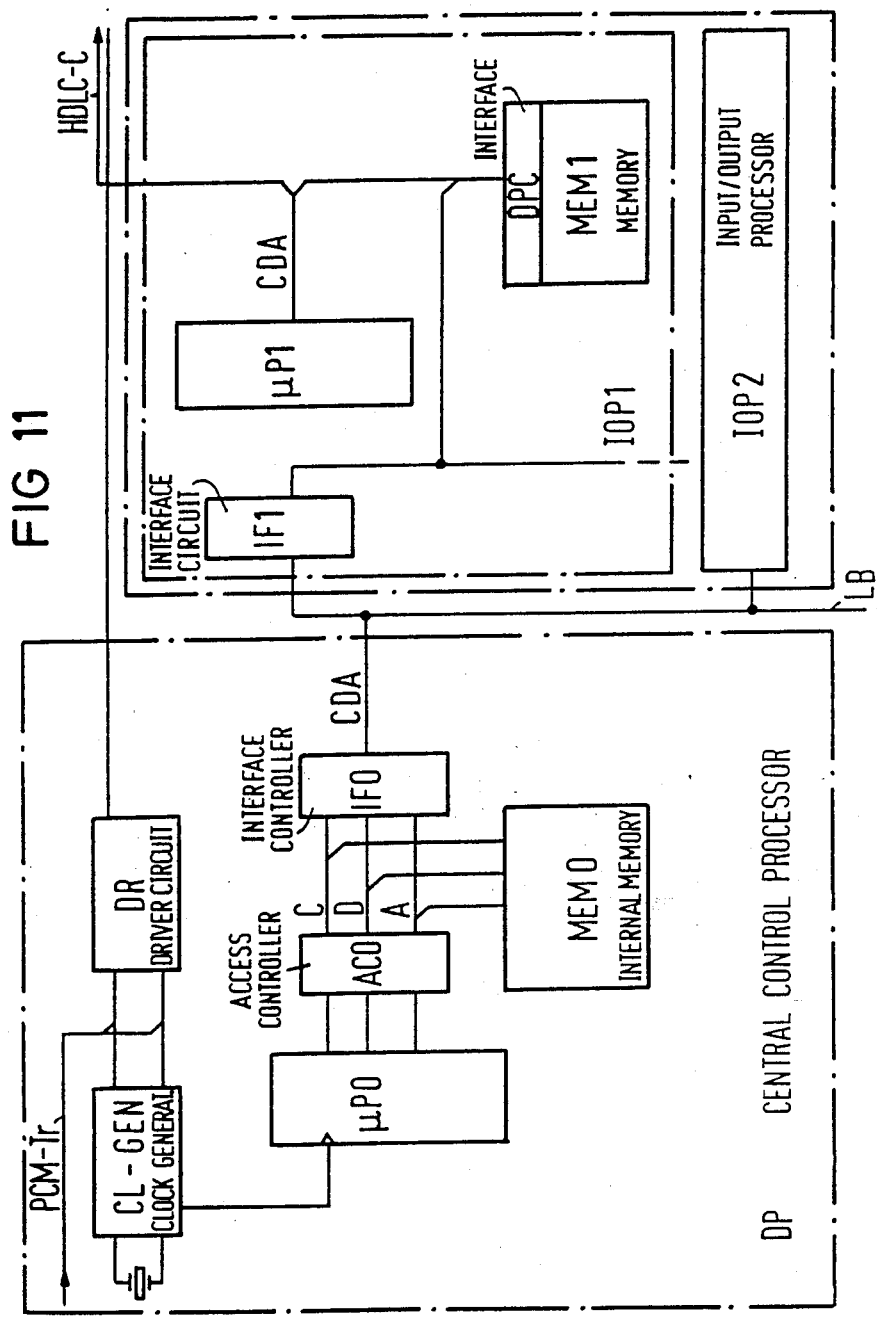
FIG. 11 is a diagram of a schematic illustration of the central control processor and of an input/output processor contained in the hardware architecture.

It may be seen from the schematic illustration of FIG. 11 that the central control processor DP, see FIG. 1, has a microprocessor $\mu P0$ which is preceded by an access controller ACO. Incoming and outgoing control information C, data information D and address information A are present at this access controller ACO. The microprocessor $\mu P0$ has an internal memory MEM0 allocated to it that, for example, has a memory capacity o f about 1500K byte.

A clock generator CL-GEN is provided for the synchronization of the overall switching control with the transfer clocks on the PCM lines, this clock generator CL-GEN outputting clock pulses to the periphery level of the communications system via an adapted driver circuit DR.

The central control processor DP is connected to the multiplex bus LB, as shown in FIG. 1, by an interface controller IFO, this multiplex bus LB, among other things, representing the connection to the input/output processors IOP1, IOP2.

In a fashion similar to that of the central control processor DP, the microprocessor IOP1, and, in the same way, the input/output processor IOP2, is equipped with a microprocessor P1 to which an internal memory MEM1 is allocated. This memory MEM1 is a dual port RAM and consequently has an interface DPC that enables a simultaneous roll-out and roll-in.

Control information C, data information D and address information A are exchanged in the direction toward the periphery with two allocated communications modules HDLC-C (not shown). In the direction toward the central control processor, an interface circuit IF1 interfaces with the multiplex bus LB.

The input/output processors IOP1, IOP2 assist the central control processor DP in running time-critical jobs. Important functions of the input/output processors IOP1, IOP2 are the polling of the terminal assemblies, the control of the information outgoing to lines or subscribers via the terminal assemblies, outputting numerals and clocking tones and calls.

FIG. 12 shows the essential component parts of the further periphery module PER0 contained in FIG. 10. Based on the illustration in FIG. 10, the two PCM highways that lead to the digital switches matrix network are referenced PCM0 and PCM1. Likewise based on the illustration in FIG. 10, the transmission channel to a control information communications module is referenced HDLC0.

Both the PCM highways PCM0, PCM1 as well as the transmission channel HDLC0 represent connections of a processor PBC (peripheral board controller). The processor PBC is preferably realized with the same module as the assembly processors. A further connection level of the processor PBC is in communication with a total of eight signal processors μPO0, μPO1 ... μPO7 to which different functions are assigned. The signal processors μPO0, μPO1 ... μPO7, for example, functions as code receivers and code transmitters for selection characters utilized in the multifrequency code method, provide for generating call tones and announcements as well as for transmitting and receiving test signals.

The signal processors μPO0, μPO1 ... μPO7 as well as the processor PBC have a memory RAM for programs and data allocated to them. The processor PBC accesses a bus structure via its terminal B, the memory RAM and a module processor μP being connected to this bus structure in addition to the signal processors μPO0, μPO1 ... μPO7.

Further outputs of the processor PBC connected to the communications system serve for the acceptance of the PCM clock (2.04 MHz) CKA and of a frame synchronization clock of 8KHz-FMB. A peripheral reset signal with which a defined initial status of the further periphery module PER0 can be set is supplied via the terminal PRS.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A modularly structured digital communications system for connecting terminal equipment having versatile performance features to one another and to public networks, comprising:

a central communication computer having a system data base and at least one multi-tasking operating system, for the administration of a line technology task having device program modules hierarchically subordinated to a line technology task organization program exercising distributor functions as a logical network node, said device program modules, controlling a signalling procedure and a user interface of the terminal equipment associated with types of terminal equipment, the system data base being individually accessible to said device program modules via defined data base access rountines, and said device program modules having a pre-processing program level that evaluates signals output by the terminal equipment according to individual line criteria and converts logical messages of the communication computer into setting data for the terminal equipment and having an interpretation program level that converts signals output by the terminal equipment into logical messages by means of system-associated parameters, and for the administration of a switching technology task having switching procedure program modules hierarchically subordinated to a switching technology task organization program exercising distributor functions as a logical network node, the system data base being individually accessible to said switching procedure program modules via said defined data base access rountines, and said switching procedure program modules being structured such independently of the class of terminal equipment and independently of the communications services by forming logical sub-processes of the overall switching process such that, in addition to forming at least one connection handler program module for the control of the set up and clear down of connections, further performance feature program modules for the activation and de-activation of corresponding control procedures are formed, whereby the line technology task has an input and output memory administered by the line technology task organization program and operated mailbox-like allocated to it and the switching technology task has an input and output memory administered by the switching technology task organization program and operated mailbox-like allocated to it;

the multi-tasking operating system forming and administering a program bus structure having a transmission protocol defined with universal validity independently of the communications services and independently of the types of terminal equipment for the messages communicated thereover as a logical network node for the intercommunication of the connection handler program modules and at least a part of the performance feature program modules via the input and output memories of the switching technology task and of the line technology task.

2. The communication system according to claim 1, wherein the line technology task is supplemented by a switching matrix network task having a switching matrix network device program module administered by a switching matrix network task organization program.

3. The communications system according to claim 1, wherein a periphery memory administered by an input/output processor has an input terminal for messges for the terminal equipment acquired in at least one of the line technology task and the switching matrix network task, and an output terminal for message acquired from signals of the terminal equipment, said input terminal and said output terminal being controllable independently of one another.

4. The communications system according to claim 3, wherein transfer memorys operated mailbox-like are allocated both to said input terminal as well as to said output terminal.

5. The communications system according to claim 4, wherein the device program modules of the line technology task are linked to the transfer memory for the messages to be output to the terminal equipment.

6. The communications system according to claim 3, wherein the switching matrix network task has an input and output memory administered by the switching matrix network task organization program and operated mailbox-like allocated to it, said input and output memory having its input side linked to the transfer memory for the signal input from the terminal equipment.

7. The communications system according to claim 6, wherein the switching matrix network device program module of the switching matrix network task is linked to the transfer memory for the messages to be output to the terminal equipment.

8. The communications system according to claim 5, wherein the transmission of the signals initiated by the terminal equipment from the allocated transfer memory to the input and output memory of at least one of the line technology task, and the switching matrix network task, and from the device program modules to the transfer memory for the messges to be output to the terminal equipment occurs in a transport layer of a message protocol of the multi-tasking operating system.

9. The communications system according to claim 3 wherein the input/output processor is equipped with an operating system substantially identical to said multi-tasking operating system.

10. The communications system according to claim 1, wherein the interpretation program level has an allocation program for discrimination between signals that start a switching-associated process and signals that form auxiliary information for a started process.

11. The communications system according to claim 10, wherein the allocation program, for the appearance of a signal starting a switching-oriented sub-process during an ongoing, other switching-associated sub-process, executes a check for compatibility of the two switching-oriented processes and, dependent thereon, starts the second process or suppresses a start message for the new process until a message concerning the conclusion of the first process occurs.

12. The communications system according to claim 10, wherein the allocation program for the appearance of signals forming auxiliary information, forwards logical messges corresponding thereto to one of the switching procedure program modules.

13. The communications system according to claim 10 wherein the allocation program has a protocol program for storing data concerning the nature of every started process that is still ongoing.

14. The communications system according to claim 11 wherein at least one type of device program modules has a plurality of device program sub-modules corresponding in number to the number of exclusive sub-sets of all functions of a terminal equipment; and wherein the allocation program branches onto the device program sub-modules dependent on function.

15. The communications system according to claim 1, wherein at least some of the switching procedure program modules have a plurality of switching procedure sub-modules allocated to a defined sub-function of the connection handler, branching onto said switching procedure sub-modules being undertaken by an allocation program individually associated with a switching procedure program module.

16. The communications system according to claim 1 wherein the connection handler program module is directly subordinated to the switching technology task organization program and the performance feature program modules are incorporated into the connection handler in the form of sub-programs of the connection handler program module.

17. The communications system according to claim 16, wherein the distribution of the performance-feature-related programs onto the performance feature program modules is undertaken such that at least the programs related to performance features associated with communications services are respectively implemented in a performance feature program module.

18. The communications system according to claim 6, wherein the connection handler program module has a switching matrix network control program module allocated to it in which the control of input and output memories of a digital time-division multiplex switching matrix network is logically realized and to which the input and output memory of the switching matrix network task is allocated for the purpose of converting logical messages into physical switch instructions for the switching matrix network.

19. The communications system according to claim 15, wherein a packet-switching switching matrix network control program module serving for the control of a packet-switching switching matrix network is provided, this being linkable by the program bus structure to the connection handler program module and to a packet-switching switching matrix network device program module.

20. The communications system according to claim 1, wherein first memory areas for the acceptance of connection-relevant data for the duration of the connection are provided in the data base and second memory areas separate therefrom for the acceptance of relevant-volatile-data only during a message exchange are provided in said data base.

21. The communications system according to claim 20, wherein the messages communicated via the program bus structure contain memory addresses for designational selection of the first and second memory areas containing the connection-relevant data belonging to the respective message and containing volatile data, respectively.

22. The communications system according to claim 1, wherein the messages communicated via the program bus structure contain particulars in a head part regarding the program module of a task outputing the message and regarding the program module of a task intended as receiver.

23. The communications system according to claim 20, wherein a memory block for transparent data output from a terminal equipment is provided in the second memory area for the acceptance of volatile data, these transparent data being accepted by one of the device program modules but being processed neither in this device program module nor in one of the switching procedure program modules.

24. The communications system according to claim 23, wherein the transparent data can be output from this memory block to a device program module allocated to the type of the receiver terminal equipment, being output thereto for transmission to the receiver terminal equipment.

25. The communications system according to claim 21, wherein the messages has service indicators oriented to the different communications services in a useful data channel of a trunk line to the terminal equipment, these service indicators being utilized as basis for compatibility checks and for determining the type of receiver terminal equipment belonging to the requested communications service.

* * * * *